United States Patent
Papadopoulos et al.

(10) Patent No.: US 10,563,927 B2
(45) Date of Patent: Feb. 18, 2020

(54) HIGH TEMPERATURE THERMAL ENERGY EXCHANGE SYSTEM WITH HORIZONTAL HEAT EXCHANGE CHAMBER AND METHOD FOR EXCHANGING THERMAL ENERGY BY USING THE HIGH TEMPERATURE THERMAL ENERGY EXCHANGE SYSTEM

(71) Applicant: SIEMENS GAMESA RENEWABLE ENERGY A/S, Brande (DK)

(72) Inventors: Theodoros Papadopoulos, München (DE); Volker Seidel, Pansdorf (DE); Walter Voehringer, Hamburg (DE)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 124 days.

(21) Appl. No.: 15/508,254

(22) PCT Filed: Mar. 20, 2015

(86) PCT No.: PCT/EP2015/055953
§ 371 (c)(1),
(2) Date: Mar. 2, 2017

(87) PCT Pub. No.: WO2016/050365
PCT Pub. Date: Apr. 7, 2016

(65) Prior Publication Data
US 2017/0276435 A1    Sep. 28, 2017

(30) Foreign Application Priority Data
Sep. 30, 2014   (EP) .................................... 14187070

(51) Int. Cl.
*F28D 17/02* (2006.01)
*F28D 17/04* (2006.01)
(Continued)

(52) U.S. Cl.
CPC ................ *F28D 17/02* (2013.01); *F01K 3/08* (2013.01); *F28D 17/04* (2013.01); *F28D 20/003* (2013.01);
(Continued)

(58) Field of Classification Search
CPC ...... F28D 20/023; F28D 20/028; F28D 17/04; F28D 17/02; F28D 17/00; F28D 17/005;
(Continued)

(56) References Cited

U.S. PATENT DOCUMENTS 1,688,700 A * 10/1928 Gauss .................... F28D 17/00
165/4
2,049,477 A * 8/1936 Vierow .................. F28D 17/04
432/24
(Continued)

FOREIGN PATENT DOCUMENTS

CN     2925949 Y  *  7/2007
DE     103 26 027 A1    12/2004
(Continued)

OTHER PUBLICATIONS

International Search Report and Written Opinion for PCT Application No. PCT/EP2015/055953, dated Oct. 21, 2015.

*Primary Examiner* — Tho V Duong
(74) *Attorney, Agent, or Firm* — Schmeiser, Olsen & Watts LLP (57) ABSTRACT

High temperature thermal energy exchange system with horizontal heat exchange chamber and method for exchanging thermal energy by using the high temperature thermal energy exchange system
A high temperature thermal energy exchange (heat) exchange system is provided. The high temperature thermal energy exchange system comprises at least one horizontal
(Continued)

heat exchange chamber with chamber boundaries which surround at least one heat exchange chamber interior of the heat exchange chamber, wherein the chamber boundaries comprise at least one inlet opening for guiding in an inflow of at least one heat transfer fluid into the heat exchange chamber interior and at least one outlet opening for guiding out an outflow of the heat transfer fluid out of the heat exchange chamber interior, at least one heat storage material is arranged in the heat exchange chamber interior such that a heat exchange flow of the heat transfer fluid through the heat exchange chamber interior causes a heat exchange between the heat storage material and the heat transfer fluid and the heat high temperature thermal energy exchange system is developed such that horizontal heat exchange flows of the heat transfer fluid through the heat exchange chamber interior differ from each other in vertical direction. The horizontal heat exchange flows are different in vertical direction of the heat exchange chamber. The heat transfer fluid is led into heat exchange channels via the inlet openings and is led out of the heat exchange channels via the outlet openings. Preferably, the heat transfer fluid is air with ambient pressure. An operating temperature of the high temperature thermal energy exchange system is more than 600 ° C.

19 Claims, 8 Drawing Sheets

(51) Int. Cl.
| | | |
|---|---|---|
| F28D 20/00 | (2006.01) | |
| F28D 20/02 | (2006.01) | |
| F01K 3/08 | (2006.01) | |
| F28F 9/02 | (2006.01) | |
| F28F 27/02 | (2006.01) | |

(52) U.S. Cl.
CPC ......... *F28D 20/0056* (2013.01); *F28D 20/02* (2013.01); *F28F 9/02* (2013.01); *F28F 27/02* (2013.01); *F28F 2009/029* (2013.01)

(58) Field of Classification Search
CPC . F28D 19/00; F28D 19/02; F01K 3/00; F03G 6/067
USPC .............................................. 165/10
See application file for complete search history.

(56) References Cited

U.S. PATENT DOCUMENTS

| | | | | |
|---|---|---|---|---|
| 3,225,819 | A * | 12/1965 | Stevens ................. | F24F 12/001 165/200 |
| 3,416,509 | A * | 12/1968 | Huebler ................ | F24C 14/025 126/21 A |
| 4,259,401 | A * | 3/1981 | Chahroudi .............. | E04C 1/392 126/618 |
| 4,966,228 | A * | 10/1990 | Fawcett .................. | F28D 17/02 165/10 |
| 5,069,272 | A * | 12/1991 | Chagnot ............... | F24F 3/1423 165/10 |
| 5,285,842 | A * | 2/1994 | Chagnot ............... | F24F 3/1423 165/10 |
| 5,853,045 | A * | 12/1998 | Patry ..................... | F28D 20/023 165/10 |
| 2003/0121637 | A1* | 7/2003 | Lee ....................... | F28D 20/021 165/10 |
| 2010/0218500 | A1* | 9/2010 | Ruer ........................ | F01K 3/12 60/659 |
| 2012/0055661 | A1 | 3/2012 | Feher | |
| 2013/0340432 | A1 | 12/2013 | Hunt | |
| 2014/0182319 | A1* | 7/2014 | Hunt .................. | B60H 1/00257 62/238.1 |

FOREIGN PATENT DOCUMENTS

| | | |
|---|---|---|
| EP | 2 698 505 A1 | 2/2014 |
| FR | 2 965 341 A1 | 3/2012 |
| GB | 2 501 795 A | 11/2013 |
| RU | 2162584 C2 * | 1/2001 |
| WO | 2013167158 A1 | 11/2013 |

* cited by examiner

HIGH TEMPERATURE THERMAL ENERGY EXCHANGE SYSTEM WITH HORIZONTAL HEAT EXCHANGE CHAMBER AND METHOD FOR EXCHANGING THERMAL ENERGY BY USING THE HIGH TEMPERATURE THERMAL ENERGY EXCHANGE SYSTEM

CROSS-REFERENCE TO RELATED APPLICATIONS

This application claims priority to PCT Application No. PCT/EP2015/055953, having a filing date of Mar. 20, 2015, based off of European application No. EP 14187070.9 having a filing date of Sep. 30, 2014, the entire contents of which are hereby incorporated by reference.

FIELD OF TECHNOLOGY

The following refers to a high temperature thermal energy exchange system with horizontal heat exchange chamber and method of exchanging thermal energy by using the high temperature thermal energy exchange system.

BACKGROUND

Despite the integration of renewable energy into the public electric energy system (power grid) a large share of electricity is nowadays still generated by fossil energy sources. But the global climate change requires the further development of renewable energies.

The energy output of renewable energy sources like wind and solar is not constant throughout a day or throughout a year. Consequently, electricity which is generated by utilizing energy from renewable energy sources fluctuates.

In order to handle this fluctuating electricity energy storage units are developed. Such energy storage units are a) mechanical storage units e.g. pumped hydro storage, compressed air storage or flywheels, (b) chemical energy storage units e.g. storage of hydrogen, batteries and organic molecular storage, (c) magnetic energy storage units, and (d) thermal energy storage units with water or molten salts.

However, only pumped hydro storage is already today well-established and matured as a large scale energy storage technology. All other storage technologies are lacking capability to store electric energy at low cost, whereas pumped hydro storage is geographically limited to certain regions (sufficient geodetic heights).

SUMMARY

An aspect relates to providing an efficient solution for storing (absorbing) energy and releasing the stored (absorbed) energy.

A high temperature thermal energy (heat) exchange system is provided. The high temperature thermal energy exchange system comprises at least one horizontal heat exchange chamber with chamber boundaries which surround at least one heat exchange chamber interior of the heat exchange chamber, wherein the chamber boundaries comprise at least one inlet opening for guiding in an inflow of at least one heat transfer fluid into the heat exchange chamber interior and at least one outlet opening for guiding out an outflow of the heat transfer fluid out of the heat exchange chamber interior, at least one heat storage material is arranged in the heat exchange chamber interior such that a heat exchange flow of the heat transfer fluid through the heat exchange chamber interior causes a heat exchange between the heat storage material and the heat transfer fluid and the high temperature thermal energy exchange system is developed such that horizontal heat exchange flows of the heat transfer fluid through the heat exchange chamber interior differ from each other in vertical direction. The vertical heat exchange flows are different in vertical direction of the heat exchange chamber.

The heat exchange chamber is a space, cavity, excavation or a housing in which the heat storage material is located. Within the heat exchange chamber the heat exchange takes place. In order to provide an efficient heat exchange, the heat exchange chamber is preferably thermally insulated against the surroundings. The loss of thermal energy is reduced by the thermal insulation.

The heat transfer fluid is guided (led) into the heat exchange chamber interior via the inlet opening and is guided out of the heat exchange chamber interior via the outlet opening. There is an inlet area of the chamber boundary with the inlet opening and there is an outlet area of the chamber boundary with the outlet opening. The inflow of the heat transfer fluid into the heat exchange chamber and the outflow of the heat transfer fluid out of the heat exchange chamber result in the heat exchange flow of the heat transfer fluid through the heat exchange chamber interior.

Based on embodiments of the invention, different (mass) flows of the heat transfer fluid in vertical direction lead to a uniformed temperature front. For this it is preferable to have a mass ratio of the mass flows which is higher than 50%, preferably higher than 60% and more preferably higher than 70%.

In order to provide an efficient heat exchange, the heat exchange chamber is preferably thermally insulated against the surroundings. The loss of thermal energy is reduced by the thermal insulation.

The heat transfer fluid is led (guided) into the heat exchange chamber interior via the inlet opening and is led out of the heat exchange chamber interior via the outlet opening. There is an inlet area of the chamber boundary with the inlet opening and there is an outlet area of the chamber boundary with the outlet opening.

For the guiding of the heat transfer fluid into the heat exchange chamber and for the guiding of the heat transfer fluid out of the heat exchange chamber a pipe system (or channel system, ducting system) is used. This pipe system can be closed (with a closed loop) or can be open (with an open loop). For instance the heat transfer fluid is ambient (air of the environment). The loop is an open loop. Air from the environment is introduced into the high temperature thermal energy exchange system and air of the high temperature thermal energy exchange system is released to the surroundings. There is an air exchange during the operation of the high temperature thermal energy exchange system. In contrast to that, there is no air exchange or a selectively adjustable air exchange during the operation in a closed loop. This has following specific advantage: In a situation with an almost completely charged heat storage material, heat transfer fluid with remaining heat is released to the environment in an open loop. The remaining heat is lost. In contrast to that, in a closed loop this heat transfer fluid with remaining heat stays in the high temperature thermal energy exchange system. The remaining heat is not lost. Therefore, in a preferred embodiment, a closed loop is implemented and wherein the inflow comprises the outflow.

In addition to the high temperature thermal energy exchange system a method for exchanging thermal energy by using the high temperature thermal energy exchange system is provided, wherein in an operating mode of the high temperature thermal energy exchange system a heat exchange flow of heat transfer fluid is guided through the heat exchange chamber interior, whereby a heat exchange between the heat storage material and the heat transfer fluid is caused. Heat exchange between the heat transfer fluid and the heat storage material occurs. The operating mode is selected from the group consisting of charging mode and discharging mode. During the charging mode a heat transfer from the heat transfer fluid to the heat storage material takes place whereas during the discharging mode a heat transfer from the heat storage material to the heat transfer fluid takes place.

Depending on the operating mode, a specific opening can have the function of an inlet opening or the function of an outlet opening. The flow direction of the heat exchange flow depends on the operating mode. Preferably, during the charging mode the heat exchange flow is directed in a charging mode direction, during the discharging mode the heat exchange flow is directed in a discharging mode direction and the charging mode direction and the discharging mode direction are opposite to each other (countercurrent). But, a change of the directions of the heat exchange flow is not necessary. Charging mode direction and discharging mode direction comprise the same direction (co-current). In a different operational use the main flow direction of the heat transfer fluid is the same for the charging mode and the discharging mode.

In countercurrent operation, switching from the charging mode to the discharging mode the direction of the exchange flow through the heat exchange chamber interior is reversed and consequently, the function of the openings (inlet opening, outlet opening) as well as a relative temperature (cold or hot) at the opening is reversed, too. With such a solution it is especially advantageous to use the same heat transfer fluid for the charging mode and for the discharging mode. But of course, different heat transfer fluids for the charging mode and the discharging mode can be used, too.

The high temperature thermal energy exchange system is especially adapted for operation at high temperatures. Therefore, in a preferred embodiment, an operating temperature of the operating mode is selected from the range between 300° C. and 1000° C., preferably selected from the range between 500° C. and 1000° C., more preferably selected from the range between 600° C. and 1000° C., 650° C. to 1000° C. and most preferably between 700° C. and 1000° C. A deviation of the temperature ranges is possible. In this context, very advantageous is an upper limit of the temperature range of 900° C. and most preferably an upper limit of the temperature range of 800° C.

The heat storage material can be liquid and/or solid. For instance, a core of the heat storage material is solid and a coating of this solid core is liquid. Such a liquid coating can comprise ionic liquid.

The solid material comprises preferably bulk material. Mixtures of different liquid materials and different solid materials are possible as well as mixtures of liquid and solid materials.

It is possible that the heat storage material is a thermo-chemical energy storage material: Energy can be stored via an endothermic reaction whereas energy can be released via an exothermic reaction. Such a thermo chemical storage is for instance the calcium oxide/calcium hydroxide system. These heat storage materials can be arranged in specific containers out of non-reactive container material. Non-reactive means that no chemical reaction between the heat storage material and the container material takes place during the heat exchange process.

In a preferred embodiment, the heat storage material comprises at least one chemically and/or physically stable material. In the range of the operational temperature the heat storage material does not change its physical and/or chemical properties. A physically stable material does not change its physical properties during the heat exchange. For instance, the heat storage material remains in a solid state in the operating temperature range. A chemically stable material does not change its chemical composition during the heat exchange. For instance, such a chemically stable material is a phase change material (PCM).

Moreover, a complex high temperature thermal exchange system with different heat exchange chambers with different heat storage materials and/or different heat transfer fluids is possible, too. For Instance, a high temperature thermal exchange system with stones as heat storage material and a thermal exchange unit with a phase change material as a heat storage material are combined together.

In a preferred embodiment, the heat storage material comprises sand and/or stones. The stones can be natural stones or artificial stones. Mixtures thereof are possible, too. Artificial stones can consist of containers which are filled with heat storage material. This heat storage material is for instance a phase-change material or a thermo-chemical storage material (see above).

Preferably, the stones comprise gravels (pebbles), rubbles and/or grit (splits). The artificial material comprises preferably clinkers or ceramics. Again, mixtures of the mentioned materials are possible, too.

In order to provide a cheap energy storage material it is advantageous to use waste material. Therefore, in a preferred embodiment, the artificial material comprises at least on by-product of an industrial process. For instance, the by-product is iron silicate. Iron silicate origins from a slag of copper production.

In a preferred embodiment, heat exchange channels are embedded in the heat storage material for guiding of the heat exchange flow through the heat exchange chamber interior. The heat storage material forms a heat exchange bed. The heat exchange bed comprises the heat exchange channels. The heat exchange channels are embedded into the heat storage bed such that the heat exchange flow of the heat transfer fluid through the heat exchange channels causes the heat exchange between the heat storage material and the heat transfer fluid. The heat exchange channels can be formed by interspaces (gaps) of the heat storage material. For instance, the heat storage material comprises stones. The stones form the heat exchange bed with the heat exchange channels. In addition or alternatively, the heat storage material is porous. Open pores of the heat storage material form the heat exchange channels.

In a preferred embodiment, the high temperature thermal energy exchange system is equipped with at least one flow adjusting element for adjusting the heat exchange flow of the heat transfer fluid through the heat exchange chamber interior, the inflow of the heat transfer fluid into the heat exchange chamber interior and/or the outflow of the heat transfer fluid out of the heat exchange chamber interior. With the aid of the flow adjusting element it is possible to adjust a temperature distribution in the heat exchange chamber interior and within the heat storage material respectively. The use of a number of flow adjusting elements is advantageous for a fine tuning of the heat exchange flow and consequently for a fine tuning of the temperature distribution in the heat storage material.

Preferably, the flow adjusting element comprises at least one active fluid motion device (with a corresponding software system) which is selected from the group consisting of blower, fan and pump and/or the flow adjusting element comprises at least one passive fluid control device which is selected from the group consisting of activatable bypass pipe, nozzle, flap and valve. A multitude of these devices are possible as well as a combination of these devices. With the aid of such devices the heat exchange flow can be modified such that the heat exchange occurs efficiently. In addition, flow adjusting elements can be arranged serially or in parallel. For instance, two flaps are arranged at two inlet openings in order to adjust the inflows of the heat transfer fluid into the heat exchange chamber and consequently in order to adjust the temperature distribution in the heat exchange chamber.

The flow adjusting element is arranged in the heat exchange chamber, downstream of the heat exchange chamber and/or upstream of the heat exchange chamber.

In the context of the active fluid motion devices it is advantageous that driving units of the active fluid motion devices like electric motors and electrical equipment are located outside of the (possibly very hot) heat exchange flow.

The special advantage of passive control devices is that they are cheap. In addition, passive control devices are very reliable.

The term "horizontal heat exchange chamber" implies a horizontal main (average) flow of the heat transfer fluid through the heat exchange chamber interior. The flow direction of the horizontal main flow is essentially parallel to the average surface of the earth. The horizontal direction is essentially a perpendicular direction to the direction of the gravity force which affects the heat transfer fluid. Perpendicular means in this context that deviations from the perpendicularity of up to 20° and preferably deviations of up to 10° are possible.

A horizontally oriented direction of the heat exchange flow can be achieved by lateral inlet openings and/or lateral outlet openings. The horizontal heat exchange chamber comprises these openings in its side chamber boundaries. In addition, with the aid of an active fluid motion control device like a blower or a pump the heat exchange flow in the heat exchange chamber interior is caused. The heat transfer fluid is blown or pumped into the heat exchange chamber interior or is pumped or sucked out of the heat exchange chamber interior.

In contrast to the term "horizontal heat exchange chamber", the term "vertical heat exchange chamber" implies a vertical main flow of the heat transfer fluid through the heat exchange chamber interior. For instance, the operating mode is the charging mode. In a vertical heat exchange chamber the heat exchange flow is preferably directed downwards (top down) during the charging mode. The vertical main flow (essentially parallel but in the opposite direction to the direction of gravity force) can be caused by an active fluid motion control device (blower or pump). The inlet opening is located at a top of the heat exchange chamber and the outlet opening is located at a bottom of the heat exchange chamber.

Based on natural convection, in a vertical heat exchange chamber the temperature of the heat storage material along a cross section perpendicular to the flow direction of the heat transfer fluid is approximately the same (horizontal isothermal lines).

In contrast to that, in a horizontal heat exchange chamber due to natural convection the temperature of the heat storage material along the cross section perpendicular to the flow direction of the heat transfer fluid (see below) can differ (inclined isothermal lines).

In a preferred embodiment, at least two inlet openings are arranged vertically to each other and/or at least two outlet openings are arranged vertically to each other. Openings are arranged above each other. By this measure it is possible to influence a vertical distribution of heat exchange flows in order to improve a temperature distribution (temperature front) in the heat storage material and heat exchange chamber interior respectively. Isothermal lines perpendicular to the flow direction are influenced.

The temperature front is defined by neighboring cold and hot areas of the heat storage material in the heat exchange chamber interior caused by the flow of the heat transfer fluid through the heat exchange chamber interior. The temperature front is aligned perpendicular to the respective flow direction of the heat exchange flow through the heat exchange chamber. During the charging mode the heat exchange flow is directed in a charging mode direction wherein the temperature front moves along this charging mode direction. In contrast to that, during the discharging mode the heat exchange flow is directed in the discharging mode direction (opposite to the charging mode direction) wherein the temperature front moves along the discharging mode direction. In both cases, the temperature front of the heat exchange chamber is migrating through the heat exchange chamber to the respective hot/cold ends of the heat exchange chamber. It is to be noted that in case of countercurrent operation, the hot (hot opening) end remains the hot end (hot opening), independently from the mode (charging or discharging mode).

The temperature front is a zone of strong temperature gradient in the heat storage material, i.e. high temperature difference between hot and cold areas. In this application it separates the hot (charged with thermal energy) and the cold (not charged) zone in the heat exchange chamber within the heat storage material. The temperature front develops due to the transfer of thermal energy from the heat transfer fluid to the heat storage material during charging and from the heat storage material to the heat transfer fluid during discharging. Isothermal zones/lines develop ideally (e.g. without the influence of gravitation) perpendicular to the main flow direction, i.e. zones/lines of constant temperature.

It has to be noted that the terms "horizontal" and "vertical" are independent from the dimensions of the heat exchange chamber and its orientation. Decisive is the direction of the heat transfer fluid through the heat exchange chamber interior. For instance, a "horizontal heat exchange chamber" can have a chamber length which is less than the chamber height of the heat exchange chamber.

Besides pure vertical and horizontal heat exchange chambers, a mixture of "vertical heat exchange chamber" and "horizontal heat exchange chamber" is possible, too. In such a chamber, the main flow of the heat transfer fluid is the result of horizontal and vertical movement of the heat transfer fluid.

In order to optimize the efficiency of the high temperature thermal energy exchange system it is advantageous to ensure a uniform temperature front. There are just small variations concerning the temperature gradients perpendicular to the flow direction. In a vertical heat exchange chamber with a flow direction top down, the temperature front is nearly uniform due to natural convection. So, in this case additional measures are not necessary. In contrast to that, natural convection leads to a non-uniform temperature front in a horizontal heat exchange chamber. So, in this case additional measures could be meaningful (like usage of more openings or usage of more flow adjusting elements).

Preferably, the chamber boundary with one of the openings comprises a transition area with a tapering profile such that an opening diameter of the opening aligns to a first tapering profile diameter of the tapering profile and a chamber diameter of the heat exchange chamber aligns to a second tapering profile diameter of the tapering profile. The transition area comprises an increasing cross section from the respective opening towards the heat exchange chamber. This is especially advantageous for the inlet opening. The diameter of the transition area expands from the opening diameter of the inlet opening to the diameter of the chamber opening. With the aid of the tapering profile the inflow of the heat transfer fluid is guided into the heat exchange chamber interior. The guided inflow is distributed to a wide area of heat storage material. By this measure a capacity of the high temperature thermal energy exchange unit (heat storage material which is located in the heat exchange chamber) can be highly exploited. In addition, the efficiency of the heat exchange can be improved by adapting the heat exchange flow. Remark: For additionally adapting the heat exchange flow, a diffuser can be located at the inlet opening, especially in the transition area. By means of the diffuser an incident flow of the heat transfer fluid into the heat exchange chamber can be adjusted. For instance, such a diffuser is formed by stones which are located in the transition area with the tapering profile.

For the case that the heat exchange chamber comprises a number of inlet openings it is very advantageous to arrange a described transition area in at least one of the inlet openings. Preferably, a number of inlet openings or every inlet opening comprises its individual transition area.

The transition area with the outlet opening can be tapered, too: A tapering of the chamber opening to the outlet opening is implemented. By this measure the guiding of heat flow out of the interior of the heat exchange chamber is simplified.

In a configuration where the flow direction of charging and discharging are opposite the tapering of the transition area at the inlet opening and the tapering of the transition area at the outlet opening ensure a desired flow distribution of the heat transfer fluid in both operating modes.

In this context the use of a short transition area is very advantageous. For instance, the short transition area comprises a dimension which is less than 50% of a heat exchange chamber length. For instance, the dimension is about 20% of the heat exchange chamber length. The length is the heat exchange chamber dimension that is parallel to the main flow direction of the heat transfer fluid through the heat exchange chamber. But of course, the dimension of the transition area is dependent on a number of features of the complete system, e.g. temperature of the heat transfer fluid, mass flow of the heat exchange flow, speed of the heat exchange flow at the relevant opening, etc.

In order to save space and in order to reduce the surface-volume ratio for a reduced heat loss, it is advantageous to implement a transition area as short as possible. The result is a short transition channel for guiding the inflow into the heat exchange chamber interior. Besides an efficient usage of the capacity of the heat exchange chamber a low space requirement is connected to this solution.

Preferably, the heat exchange chamber comprises a cylindrically shaped chamber boundary. For instance, the chamber boundary which comprises the inlet opening is formed as a circular cylinder and/or the chamber boundary with the outlet opening is formed as a circular cylinder. Such shapes lead to best surface-volume ratios.

The heat transfer fluid is selected from the group consisting of a liquid and a gas. The gas is selected from the group consisting of inorganic gas and/or organic gas. The inorganic gas is preferably air. Mixtures of different liquids are possible as well as mixtures of different gases.

Preferably, the heat transfer fluid comprises a gas at ambient gas pressure. Preferably, the gas at the ambient pressure is air. The ambient pressure (900 hPa to 1.100 hPa) varies such that the heat exchange flow through the heat exchange chamber interior is caused.

In a preferred embodiment, the high temperature thermal energy storage system is equipped with at least one charging unit for heating the heat transfer fluid. This charging unit is preferably located upstream of the heat exchange chamber (before the heated heat transfer fluid enters the heat exchange chamber).

Preferably, the charging unit comprises at least one electrical heating device which is selected from the group consisting of resistance heater, inductive heater, emitter of electromagnetic radiation and heat pump. The electromagnetic radiation is preferably infrared radiation. With the aid of the resistance heater electricity is transformed into thermal energy and transferred to the heat transfer fluid. Preferably, the resistance heater or a number of resistance heaters are located in the heat exchange flow. Preferably, the resistance heater comprises a large heat exchange area for an efficient heat exchange from the resistance heater to the heat transfer fluid. For instance, the large heat exchange area is formed by grid of the resistance heater. A meander shaped resistance is possible, too. With such a measure, the heat transfer to the heat transfer fluid is enhanced. In addition, the possibility of the not desired occurrence of hot spots within the resistance heater is reduced.

The heat exchange surface of the resistance heater is located in the heat exchange flow whereas control units and/or propulsion units of the resistance heater are located outside of the heat exchange flow. Preferably, such a unit is located at a respective cold area of the high temperature thermal energy exchange system.

A combination of different electrical heating devices is possible. Alternatively or in addition, a heating up of the heat transfer fluid with the aid of waste energy or combustion heat is possible, too.

In a preferred embodiment, the high temperature thermal energy exchange system is equipped with at least one discharging unit for discharging the heat transfer fluid of the outflow from heat for production of electricity. Thermal energy is released (removed from the heat transfer fluid) and is transformed into electricity. The thermal energy is especially used for the driving of a water/steam cycle.

In a preferred embodiment, the high temperature thermal energy exchange system is equipped with at least one measuring device for determining a charge status of the high temperature thermal energy exchange system. Preferably, the mentioned measuring device for determining a charge status of the high temperature thermal energy exchange system is a thermocouple. The thermocouple is a temperature measuring device which is based on the Seebeck effect. Alternatively, the temperature measuring device is based on electrical resistance.

For instance, the charge status of the high temperature thermal energy exchange system comprises the degree of the charging of the heat storage material with heat. With the aid of the measured charge status the operating mode (charging mode or discharging mode) can be monitored. Information about the charge status can be used for the process control of the operating modes. The charge status or state of charge refers to the energy content of the high temperature thermal exchange system which is related to the temperature of the heat storage material. If a large share of the heat storage material comprises a high temperature the state of charge or charge status is higher than if a small share of the heat storage materials at a high temperature.

In this context it is advantageous to use a number of such measuring devices. Preferably, these measuring devices are distributed over the heat exchange chamber.

The heat exchange chamber can comprise large dimensions. Preferably, a length of the heat exchange chamber is selected from the range between 20 m-250 m, a width of the heat exchange chamber is selected from the range between 20 m-250 m and a height of heat exchange chamber is selected from the range of 10 m-60 m.

For the charging cycle and/or for the discharging cycle the high temperature thermal energy exchange system comprises preferably a particle filter or other means to remove particles from the heat transfer fluid, for instance a cyclone particle remove system. The removing of particles servers the purpose of efficient heat transfer, avoid deposition of the particles, avoid cloaking and avoid possible fires. It is possible to use this filter device just for commissioning purposes. In this case, after the initial operation the filter device is removed.

With embodiments of the invention following specific advantages are achieved:

With the aid of the high temperature thermal exchange system an efficient, cost effective and reliable solution for storing and for releasing thermal energy is provided.

Thermal energy can be stored and can be released efficiently. Excess electricity is transformed into thermal energy which is stored. During the discharging mode thermal energy is transformed into electricity, e.g. with the aid of a water steam cycle. This transformation is very efficient due to high temperatures provided by the high temperature thermal energy exchange system. Electricity from the discharge mode is available during periods of high electricity consumption and high demand (of consumers or of the energy market).

Usually, the location of production of electricity with the aid from renewable energy sources such as onshore and offshore wind does not coincide with the region of high power consumption. Weak grid node points can cause a grid overload since they were designed for a constant base load and not for fluctuating renewable energy. The excess energy that exceeds the capacity of the grid can reach up to 20%. In this case the renewable energy sources have to be curtailed or even shutdown. With embodiments of the invention an efficient storage of the excess electricity is possible.

Thermal energy on a high temperature level can be stored over a long period of time. The thermal heat storages could deliver heat for more than 10 hours up to 10 days. The high temperature level in this kind of storages can be more than 600° C. and it can be directly used for reconversion in a water steam cycle. The electrification of the stored thermal energy via the water steam cycle does not depend on fuel like gas or coal and hence it is $CO_2$ emission free.

The high temperature thermal energy exchange system offers a higher energy density compared to other storage technologies. This means that more energy can be stored in a smaller volume. In addition, bulk heat storage materials are much cheaper and cost effective than molten salts or phase change materials which are currently developed.

With the aid of a charging unit with an electrical heating device very high temperatures of the heat transfer fluid are available.

Due to high temperatures an additional heating up for subsequent electrification processes, e.g. additional heating up of steam of a water/steam cycle is not necessary.

The used heat storage materials are simple and regionally available natural products like basalt stones. By-products and waste materials from industrial processes e.g. iron silicate slag from copper production are possible storage materials as well. This reduces the costs and causes short transport distances.

The high temperature thermal energy exchange system can be operated under ambient pressure (heat transfer fluid at ambient pressure). So, there is no need for installing pressure units in view of the heat transfer fluid. It is easier to reach a necessary reliability of the high temperature thermal energy exchange system. In addition, high pressure units would be expensive.

The stored thermal energy could be used for ORC (Organic Rankine Cycle) power plants. These power plants operate at relatively low operating temperatures. But preferably, the stored thermal energy is used for steam power plants. Due to the high load capacity and the high possible operating temperatures of the high temperature thermal energy exchange system the working fluid (steam) of the steam power plant can be operated at high temperatures (steam parameter). This results in a high efficiency of the steam cycle of the steam power plant.

Preferably, the high temperature thermal energy exchange system comprises a pipe system with compensation units (e.g. expansion joints) for balancing different thermal induced dimension changes (thermal dynamic loads). Thermal mismatch does not result in a damage of the pipe system. This leads to a high reliability. Alternatively or in addition, the pipe system comprises thermally insulated components, like channels which are insulated from the inside.

Generally, there is a wide use of the high temperature thermal energy exchange system for this high quality heat. It is useable not only for water steam cycles, it can also be used for industrial or power plant processes or for district heating or for industrial steam.

Concerning an additional aspect of embodiments of the invention, the high temperature thermal energy exchange system is used in a charging mode wherein the heat storage material is charged with thermal energy by heat transfer from the heat exchange fluid to the thermal storage material, and wherein a (vertically) lower heat transfer flow (lower mass flow of the heat transfer fluid) is greater than the (vertically) upper m heat transfer flow (upper mass flow of the heat transfer fluid).

The same system can be used for a discharging mode. The heat exchange unit is used for a discharging mode, wherein the heat storage material is discharged with thermal energy a heat transfer from the heat storage material to the heat exchange fluid. Thereby an upper mass flow of the vertically upper arranged mass flow is larger than the lower mass flow of the vertically lower mass flow.

The proposed solution is a new concept to realize more uniform temperature profiles in horizontal thermal storages.

BRIEF DESCRIPTION OF THE DRAWINGS

Some of the embodiments will be described in detail, with reference to the following figure, wherein like designations denote like members, wherein.

DETAILED DESCRIPTION

Core of this invention is a high temperature thermal energy exchange system 1 with a heat exchange chamber 11 on a high temperature level, which will be charged and discharged with thermal energy via a heat transfer fluid 13. Thermal energy is stored in the heat storage material 121.

The temperature level of the stored heat is significantly higher compared to methods applied so far to increase the efficiency. The temperature level lies between 300° C. and 800° C., preferably between 550° C. and 650° C. The thermal capacity of the high temperature thermal energy exchange system lies in the range between 0.3 GWh and 100 GWh, which causes a thermal power of 50 MW.

The high temperature thermal energy exchange system 1 comprises at least one heat exchange chamber 11 with chamber boundaries 111 which surround at least one heat exchange chamber interior 112 of the heat exchange chamber 11. The heat exchange chamber is a horizontal heat exchange chamber 114.

The chamber boundaries 111 comprise at least one inlet opening 1111 for guiding in an inflow 132 of at least one heat transfer fluid 131 into the heat exchange chamber interior 112 and at least one outlet opening 1112 for guiding an outflow 133 of the heat transfer fluid out of the heat exchange chamber interior 112. At least one heat storage material 121 is arranged in the heat exchange chamber interior 112 such that a heat exchange flow 13 of the heat transfer fluid 131 through the heat exchange chamber interior 112 causes a heat exchange between the heat storage material 121 and the heat transfer fluid 131.

The heat exchange chamber is at least partly integrated in the earth. An alternative embodiment of the high temperature thermal energy exchange system comprises a completely integrated heat exchange chamber.

The high temperature thermal energy exchange system 1 is equipped with a number of measuring devices 1500 for determining a charge status of the high temperature thermal energy exchange system 1. These measuring devices are distributed mainly in the heat exchange chamber 11.

The heat exchange chamber 11 is thermally insulated against the surrounding. There is a thermal insulation unit 300.

Figure 4A:
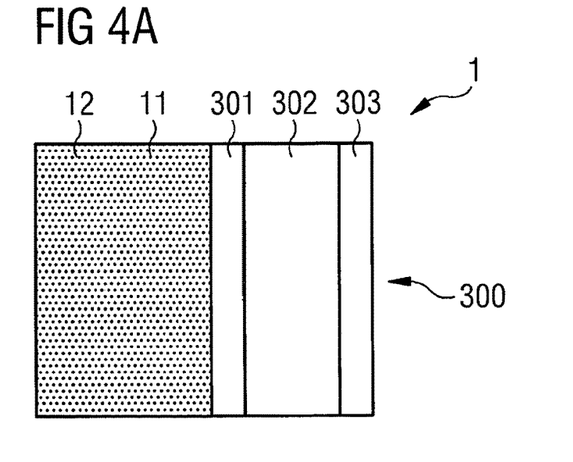
FIG. 4A shows a high temperature thermal energy exchange systems with different thermal insulations of the heat exchange chamber.
Figure 4B:
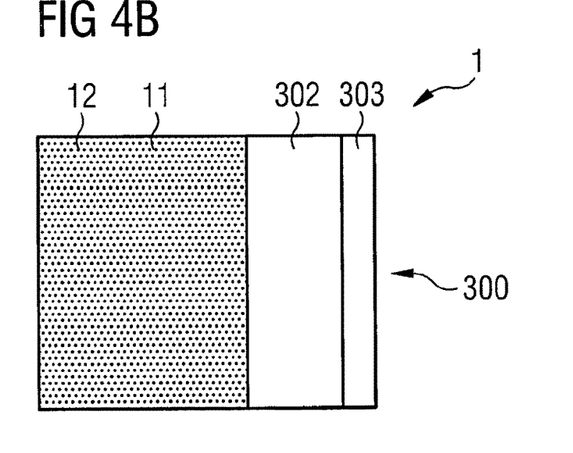
FIG. 4B aa shows high temperature thermal energy exchange systems with different thermal insulations of the heat exchange chamber.
Figure 4C:
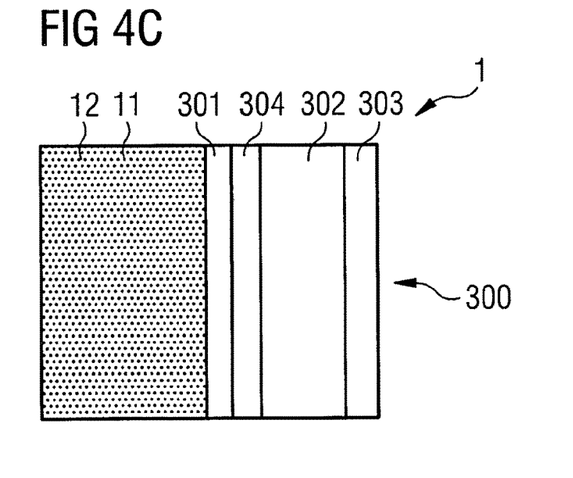
FIG. 4C shows high temperature thermal energy exchange systems with different thermal insulations of the heat exchange chamber.
Figure 6A:
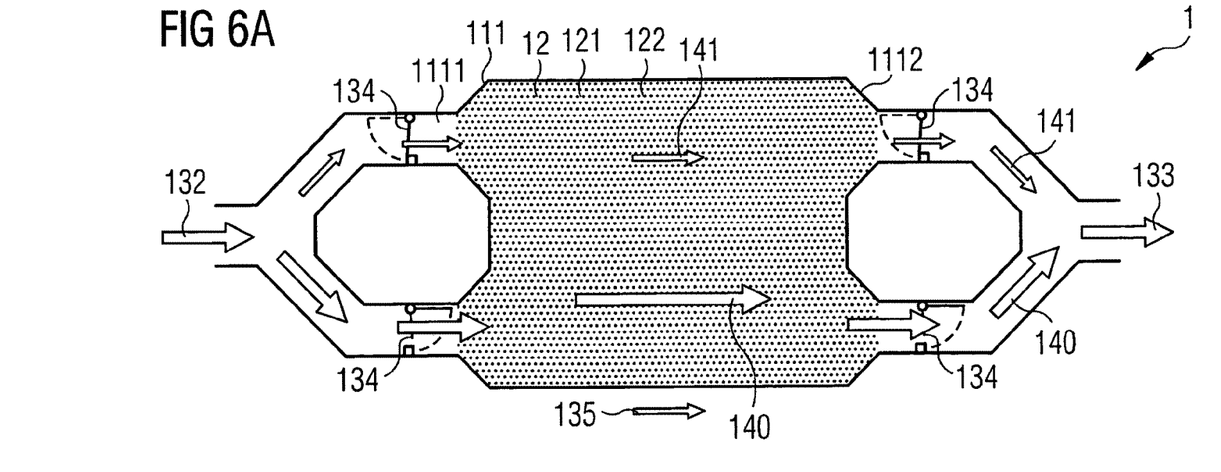
FIG. 6A shows the high temperature thermal energy exchange system in a charging mode.
Figure 6B:
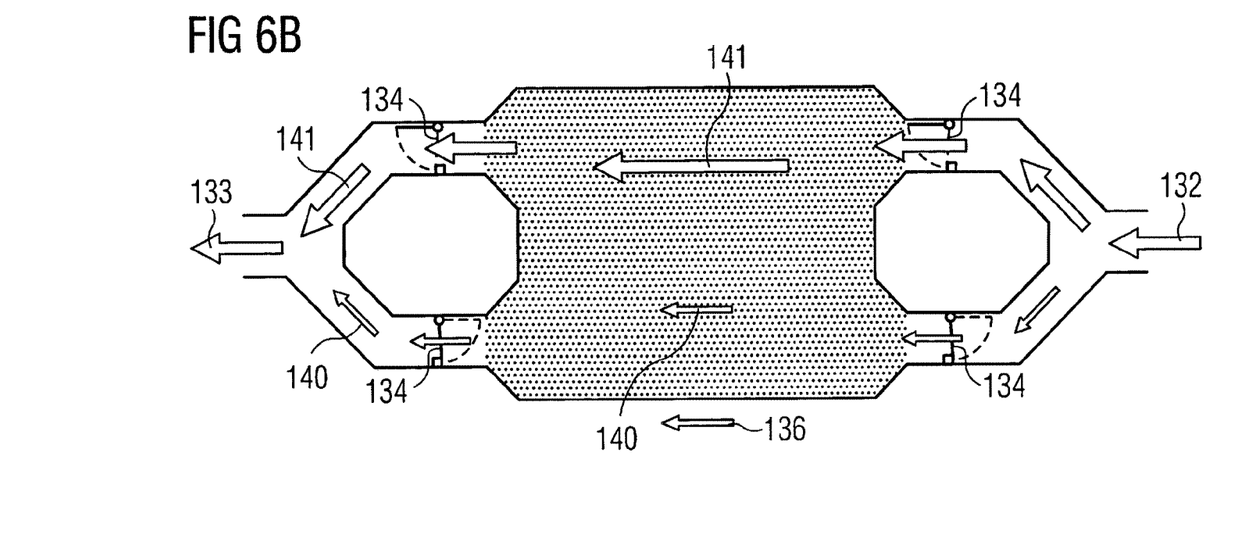
FIG. 6B shows high temperature thermal energy exchange system in a discharging mode.

Different thermal insulation possibilities (thermal insulation stacks) are shown in FIGS. 4A, 4B and 4C. Concerning FIG. 6A the insulation unit 300 comprises a first insulation cover sheet (layer) 301. This first insulation cover sheet comprises gas concrete, for instance Ytong®. Alternatively this first insulation cover sheet comprises bricks, clay, ceramics, clinker, concrete, plaster, fiber reinforced plaster, and/or metal.

The next insulation layer 302 comprises mineral wool and/or rock wool. Alternatively this insulation layer 302 comprises foamed clay or glass concrete. Mixtures of these materials are possible, too.

A third insulation layer 303 completes the insulation unit: This third insulation layer 303 has the function of a supporting structure and comprises gas concrete (for instance Ytong® or clay), clinker, concrete, plaster, fiber reinforced plaster and/or metal.

Alternatively, the first insulation layer 301 is omitted FIG. 4B).

In a further alternative solution the thermal insulation unit 300 comprises an additional intermediate insulation cover layer 304 (FIG. 4C). This additional cover layer comprises Gas concrete, clay or ceramics and has the function of an additional supporting structure.

Exemplarily, the length 118 of the horizontal heat exchange chamber 11 is about 200 m, the height 119 of the heat exchange chamber 11 is about 10 m and the width of the heat exchange chamber 11 is about 50 m.

Alternatively, cylindrically shaped heat exchange chambers 113 are used.

The proposed high temperature thermal energy exchange system will store energy on a high temperature level, which can be used during discharging to produce steam in a water steam cycle for reconversion into electrical energy. Therefore, one or several heat exchange chambers filled with solid heat storage material are used. The solid heat storage material could be bulk storages material with sand, stones or gravels, rubbles, splits, clinkers, ceramics, slag and other bulk materials, for example basalt or iron silicate slag.

The solid materials can be used alone or can be mixed with other heat storage materials (e.g. due to limited availability of materials, in order to improve the flow behavior of the heat exchange flow of the heat transfer fluid through the heat exchange chamber interior or in order to improve the heat exchange between the heat storage material and the heat transfer fluid) for the use in the high temperature thermal energy exchange system. Different particle sizes or mixture of different particle sizes (improving flow behavior and energy density) can be used, too. As a result, the filling of the heat exchange chamber with heat storage material can be homogenous or inhomogeneous.

Figure 1:
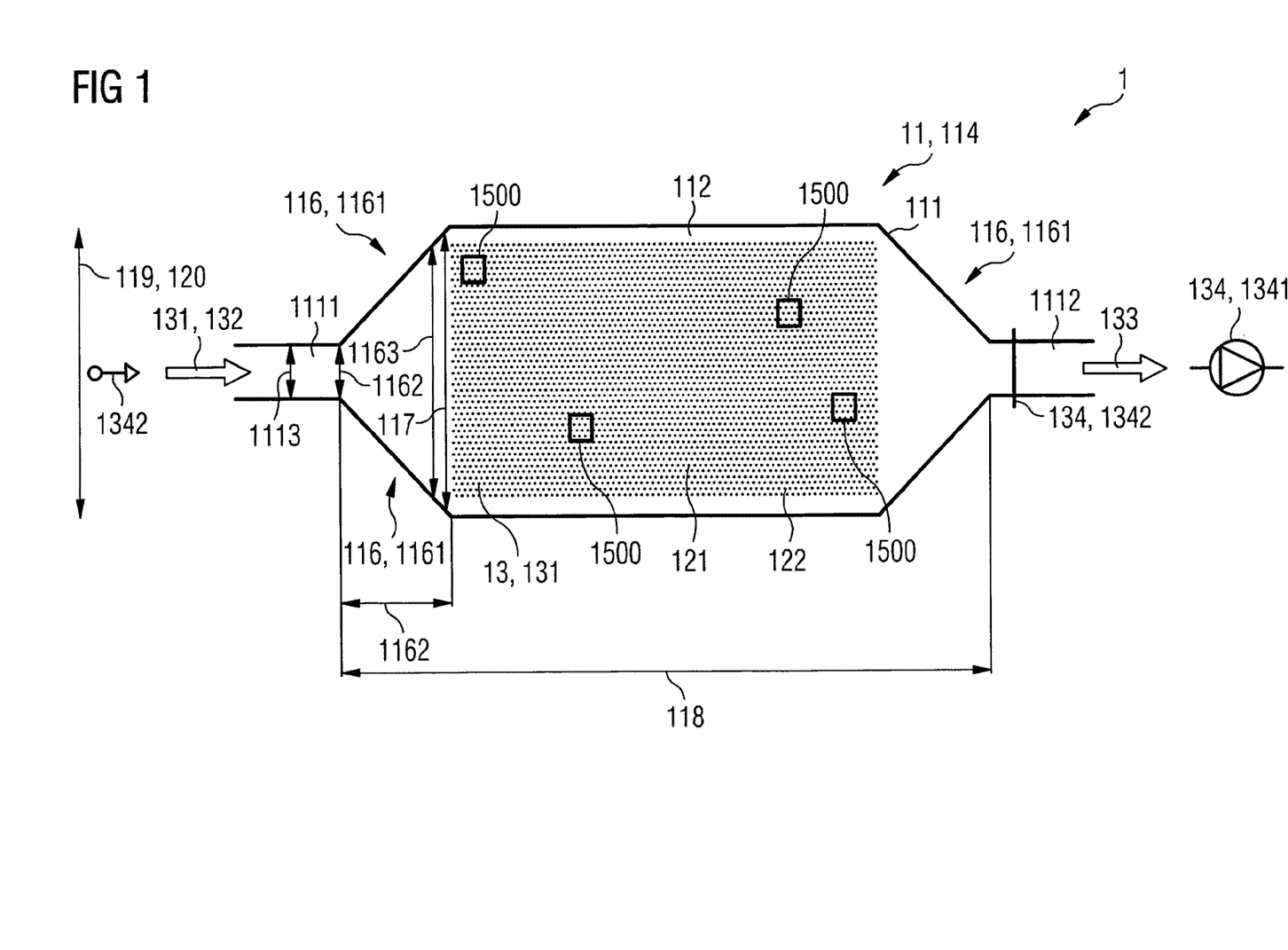
FIG. 1 shows different high temperature thermal energy exchange systems.
Figure 2:
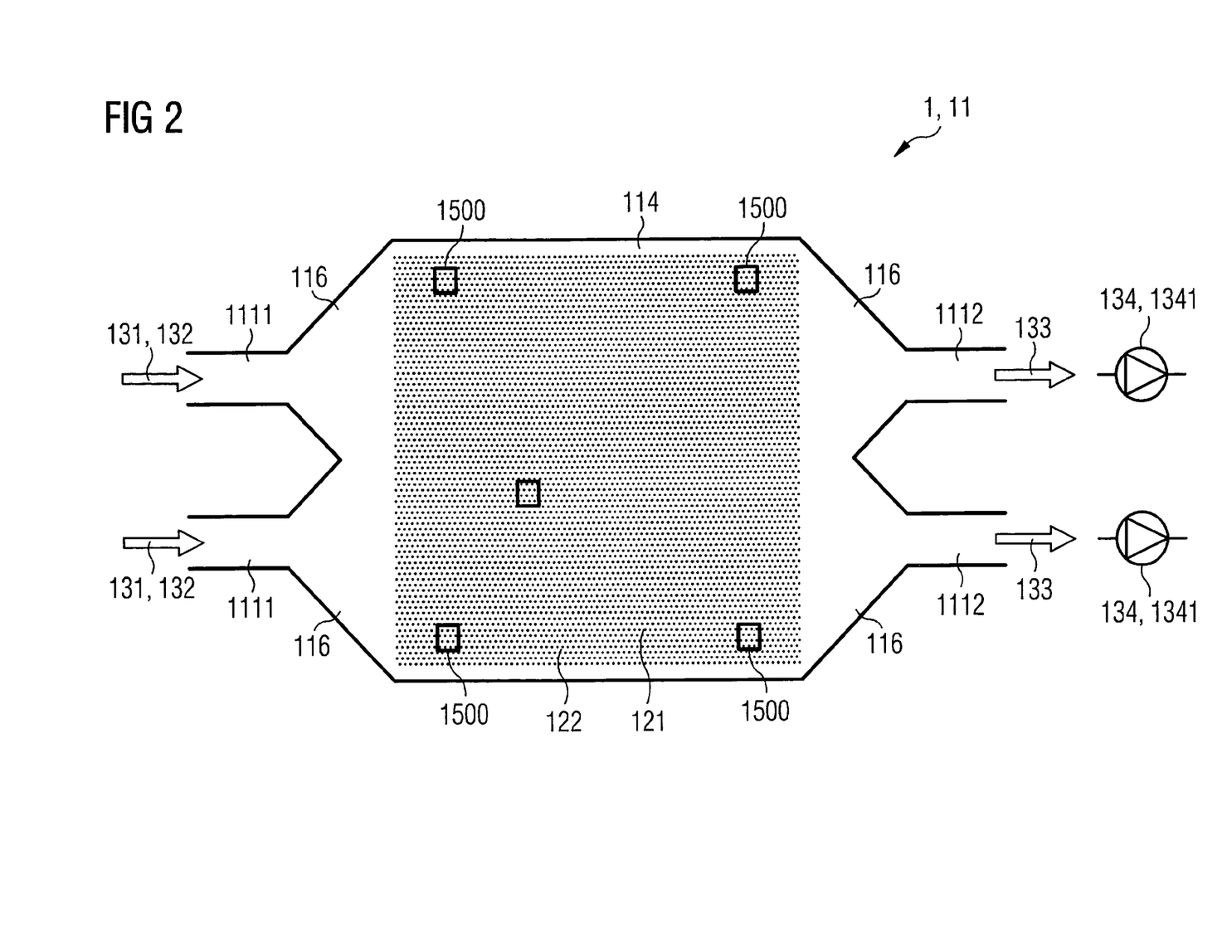
FIG. 2 shows different high temperature thermal energy exchange systems.

This solid bulk material is heated up and stores the energy over a long time period. The shape and the arrangement of one or several storages are according to the usage and the integration in a certain system. The shape of the base area depends on whether the storage will be built vertically with a vertical heat exchange chamber (no negative effect of natural convection) or horizontal (simple construction and incident flow, adaption to local conditions) as shown in FIGS. 1 and 2. The cross section of the heat exchange chamber will be a trapezoid.

There is a transition area 116 of the heat exchange chamber 11 with a tapering profile 1161. Thereby an opening diameter 1113 of the opening 1111 or 1112 aligns to a first tapering profile diameter 1162 of the tapering profile and a chamber diameter 117 of the heat exchange chamber 11 aligns to a second tapering profile diameter 1163 of the tapering profile (see FIG. 1, 2 or 3). The inflow 132 of the heat transfer fluid 13 is guided into the heat exchange chamber interior 112. The guided inflow is distributed to a wide area of heat storage material 121. By this measure a capacity of the complete heat exchange unit (heat storage material 121 which is located in the heat exchange chamber 11) can be utilized in an advantageous manner.

The transition area 116 is short. The transition area 116 comprises dimension 1162 which is less than 50% of a heat exchange chamber length 118 of the heat exchange chamber 11. The short transition area 116 projects into the heat exchange chamber 11. The result is a short transition channel for the guiding of the inflow 132 into the heat exchange chamber interior 112 of the heat exchange chamber 11.

In order to adapt the heat exchange flow 13 the high temperature thermal energy exchange system comprises a flow adjusting element 134. This flow adjusting element 134 is a blower.

Figure 3:
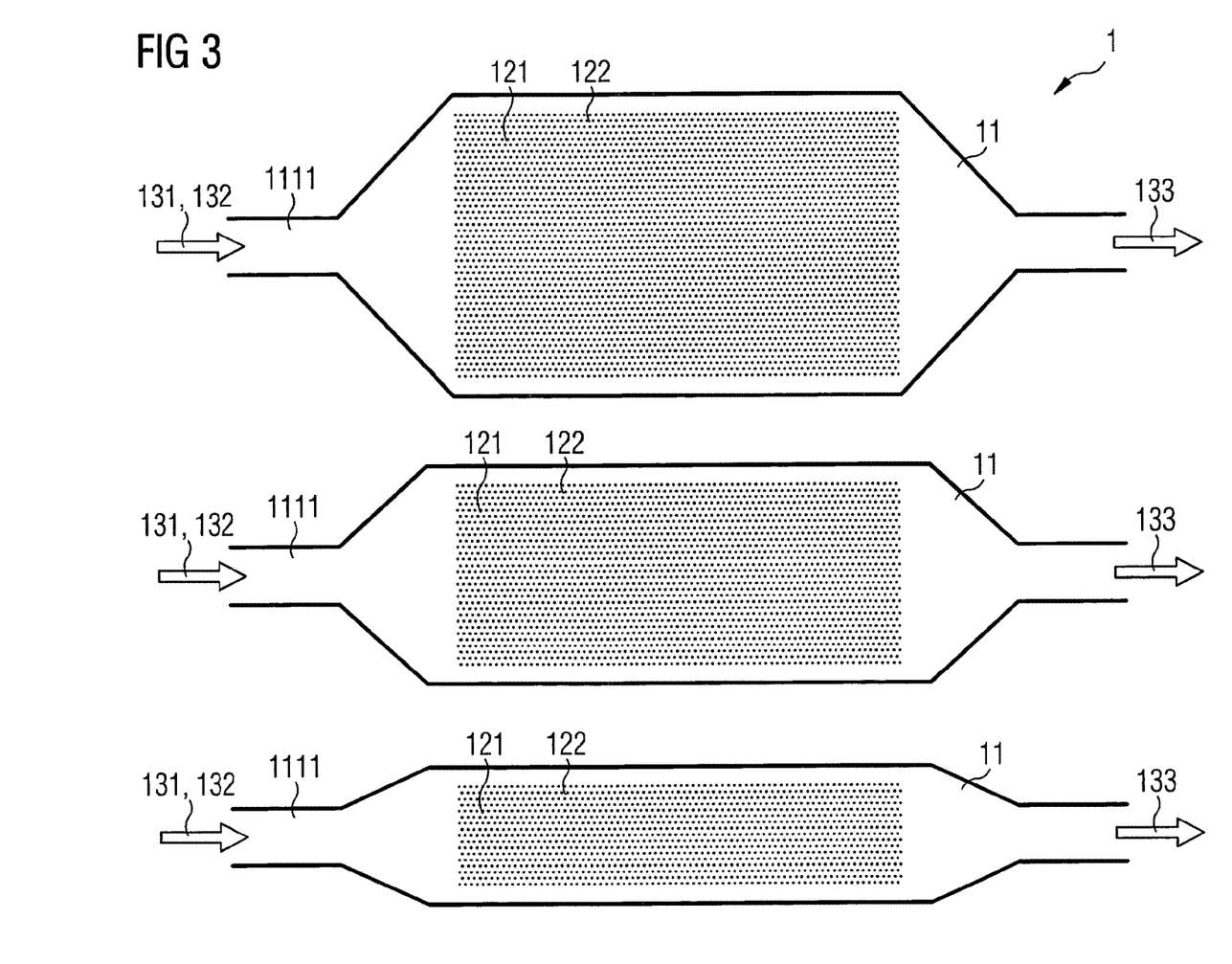
FIG. 3 shows different high temperature thermal energy exchange systems.

Furthermore the heat exchange chamber 11 can comprise one or several inlet openings 1111 and outlet openings 1112 as shown in FIG. 3.

The high temperature thermal energy exchange system 1 is additionally equipped with at least one flow adjusting element 134. The flow adjusting element is an active fluid motion device (1341) like a blower or a pump. Such a device enables a transportation of the heat transfer fluid 131 through the heat exchange chamber interior 111 of the heat exchange chamber 11. The blower or the pump can be installed upstream or downstream of to the heat exchange chamber 11.

In addition, at least one passive fluid control 1342 device like a valve is located upstream or downstream of the heat exchange chamber 11.

The high temperature thermal energy exchange system 1 is developed such that horizontal heat exchange flows 140 and 141 of the heat transfer fluid through the heat exchange chamber interior 112 differ from each other in vertical direction. The mass flows are adjusted such that in case of a charging mode, the lower mass flow is larger than the upper (mass) flow (FIG. 7A). In case of a discharging mode the upper (mass) flow 141 is larger than a lower mass flow 140.

In order to manipulate the heat exchange flow 13 the high temperature thermal energy exchange system comprises a flow adjusting element 134. This flow adjusting element 134 is a passive fluid control device 1342 like a valve.

This storage is equipped with at least one flow adjusting device 134. The flow adjusting device is an active fluid motion device like a blower or a pump (134, 134). Such a device transports the heat transfer fluid 13 through the heat exchange chamber interior 11 of the heat exchange chamber 11. The blower or the pump can be installed upstream or downstream in comparison of the heat exchange chamber. For the charging mode the installation downstream is advantageous: Relatively cold heat transfer fluid passes the flow adjusting device after releasing of heat to the heat storage material. In contrast to that, in a discharging mode the upstream installation of the flow adjusting device is advantageous: Relatively cold heat transfer fluid passes the flow adjusting device before absorbing heat from the heat storage material The horizontal heat exchange chamber can have inlet openings and outlet openings on top and bottom (decreasing natural convection) or preferably sideways (simple and inexpensive construction and simple incident flow).

The heat transfer fluid 13 enters the heat exchange chamber 11 through a (not shown) diffuser. The diffuser is arranged at the transition area 116 of the heat exchange chamber. Furthermore the heat transfer fluid can be liquid or gaseous, which also can be organic or inorganic. To guide the heat transfer fluid shutters and/or valves are used.

The temperature level of the stored heat is significantly higher compared to methods applied so far to increase the efficiency. The temperature level lies between 300° C. and 800° C., preferably between 550° C. and 650° C. The thermal capacity lies in the range between 1 GWh and 100 GWh, which causes a thermal power of 50 MW.

FIG. 2 show a horizontal heat exchange chamber 114. Thereby two inlet openings 1111 are arranged above as well as two outlet openings 1112. Theses openings comprise tapered transition areas 116. Again: Measuring devices 1500 for determining a charge status of the high temperature thermal energy exchange system are distributed in the heat exchange chamber.

Dependent on the usage and the demands, these capacity of the high temperature thermal energy exchange system can easily be adapted (heat storage material, dimensions of the heat exchange chamber, etc). For instance, for an increasing of the capacity of high temperature thermal energy exchange system the high temperature thermal energy exchange system is equipped with several storages chambers as shown in FIG. 3.

Therefore the heat exchange chambers can be arranged parallel, serial, in line, on top of each other or as single one. FIG. 3 show such an embodiment with a parallel arrangement: Three heat exchange chambers 11 form together a common storage unit.

Figure 5:
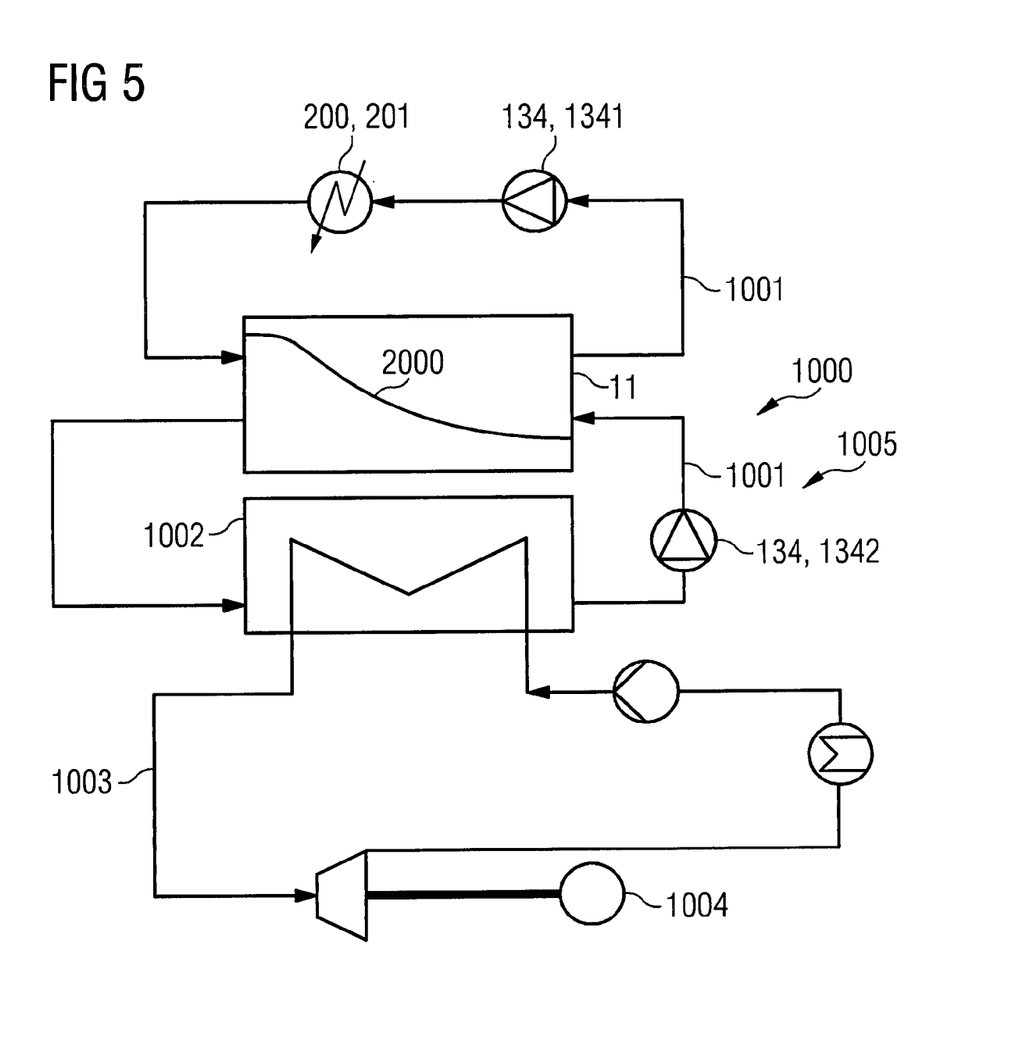
FIG. 5 shows a complete high temperature thermal energy exchange system.

Referring to FIG. 5, the complete charging and discharging system 1000 for a high temperature thermal energy exchange system 1 comprises one or several electrical heating devices 201, one or several machines to circulate the working fluid such as blowers 211 or pumps 1341 and one or several heat exchange chambers 11. The electrical heating devices 200 can be resistance heater 201, inductive heater or others. These devices are connected by a pipe or ducting system 1001. The high temperature thermal energy exchange system shown in FIG. 7 comprises a closed loop 1005.

For the charging mode, the heat transfer fluid 131 is heated up from ambient conditions by the electrical heater 201.

Alternatively, the heating (partial heating or complete heating) of the heat transfer fluid is carried out with the aid of waste heat e.g. from industrial or power plant processes or from geothermal sources with or without an electrical heating device.

This charged heat transfer fluid is guided into the heat exchange chamber interior 112 of the heat exchange chamber 11 for charging the heat storage material. Thereby the heat exchange between the heat transfer fluid and the heat storage material takes place. With reference 2000 the temperature front at a certain time of this charging process is shown.

This charged heat transfer fluid is guided into the heat exchange chamber interior 112 of the heat exchange chamber 11 for charging the heat storage material. Thereby the heat exchange between the heat transfer fluid and the heat storage material takes place. With reference 2000 the temperature front at a certain time of this charging process is shown.

The machine to circulate the heat transfer fluid 131 is preferably installed upstream or alternatively downstream of the electrical heating device or downstream of heat exchange chamber. Several heat exchange chambers 11 are combined for varying charge and discharge duration (not shown). Alternatively, just one heat exchange chamber 11 is used in order to cover the required storage capacity.

For the discharging mode the high temperature thermal energy exchange system comprises one or several heat exchange chambers 11 mentioned above, an active fluid motion control device 1341 to circulate the heat transfer fluid 131 and a thermal machine for re-electrification, which can be a water/steam cycle 1003. The working fluid of this cycle is water and steam. The water/steam cycle 1003 has the function of a discharging unit. With the aid of the heat exchange system (heat exchanger) 1002 thermal energy of the heat transfer fluid is transferred to the working fluid of the steam cycle 1002.

Figure 7:
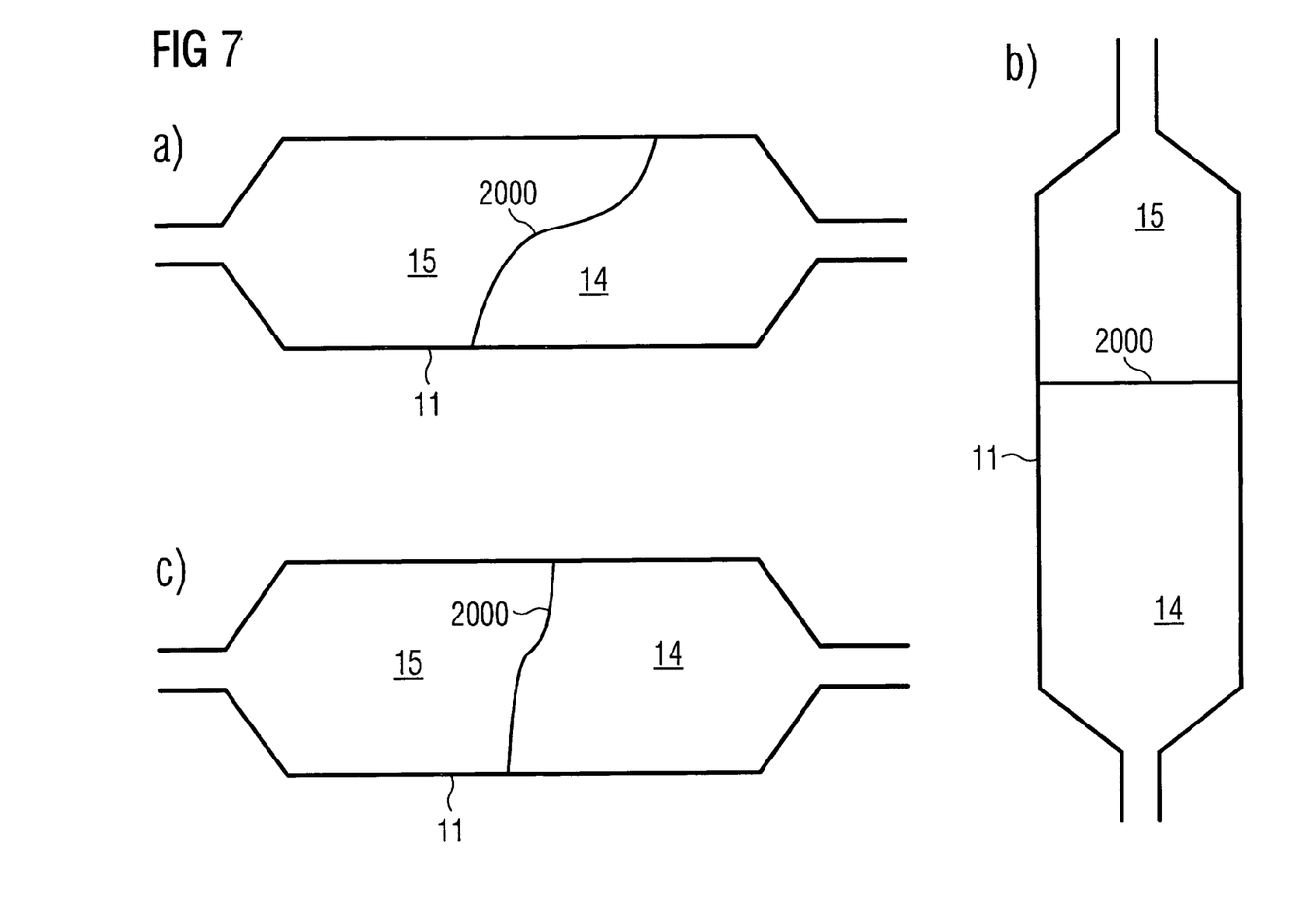
FIG. 7 shows the temperature front of a high temperature thermal energy exchange system concerning the invention in hands (solution c)) in comparison to a thermal energy exchange system concerning the state of the art (a) and b))and FIG. 8 shows a valve design which is used for the high temperature thermal energy exchange system.

The different components of the high temperature thermal energy exchange system 1 are connected with a pipe or ducting system 1001. The flow adjusting element guides the heat transfer fluid through the heat exchange chamber of the high temperature thermal energy exchange system, thermal energy is transferred from the heat storage material 121 to the heat transfer fluid 131 and is transported to the thermal machines or further applications e.g. district heating, preheating of the discharge cycle, heating of different components of the high temperature thermal energy exchange system etc. If the thermal machine is a water steam cycle, a steam generator, a heat exchanger or an evaporator, which consist of one or several units, the thermal energy is transferred to water to generate steam which is fed to a thermal engine to produce electrical power as shown in FIG. 7. If the working fluid downstream of this thermal machine still contains thermal energy at a temperature level higher than ambient, this energy can be stored in the same heat exchange chamber or in another heat exchange chamber.

The complete system with all components in charge and discharge cycle for the thermal energy storage is shown in FIG. 5.

In an energy system with high penetration of renewable energy the profitability of fossil fueled thermal power plants suffers from low operation hours. This can lead to a complete shutdown of such plants for economic reasons.

In this case or in order to increase the flexibility the steam cycle of fossil fired power plants can be combined with the high temperature thermal energy storage system proposed here. Either the installed equipment is solely used to generate electrical energy with the stored thermal energy in a heat recovery process like in CCPP (combined cycle power plant) or the thermal storage is used to increase the flexibility of a thermal power plant. In the latter case the boiler is fired with fuel when fuel costs are lower than electricity costs and the storage is charged if electricity prices are low. Charging can take place during a period of excess production of energy.

The discharging mode can be realized when electricity prices and demand are high or when the production of renewable energies is low. Well suited are CCPP since their heat recovery steam generator (HRSG) is similar to the application proposed here. Nevertheless hard coal, oil, gas, waste incineration, wood or lignite fired power plants can be used since the heater device can be designed for high temperature to match the temperatures used in the steam generator. In a hybrid mode the fuel can be used to increase the temperature from the temperature level of the storage to the operating temperature of the original furnace or boiler design.

FIG. 7c show the advantage of the invention. The temperature 2000 divide the heat exchange chamber 11 in two parts: A cold part 14 and a hot part 15. The temperature distribution 2000 doesn't show large steps perpendicular to the flow direction like for conventional horizontal heat exchange chambers (FIG. 7b). This solution is similar to a vertical heat exchange chamber 17 (FIG. 7c).

Figure 8A:
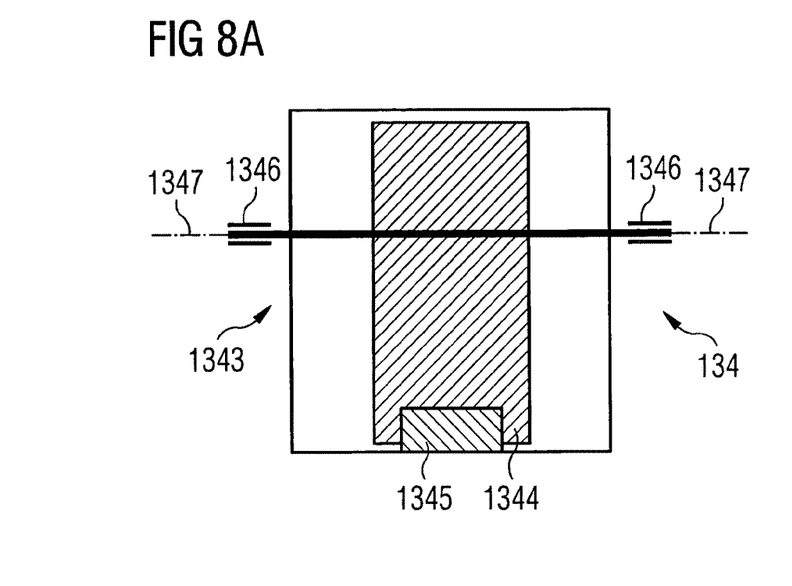
Figure 8B:
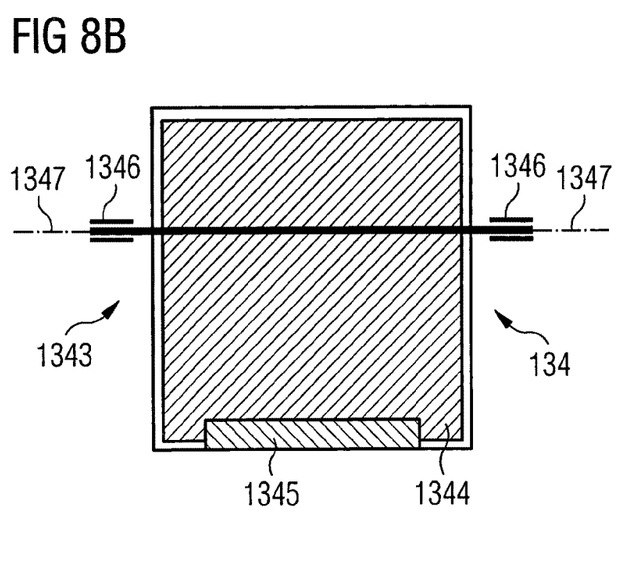

FIGS. 8A and 8B show a valve design which is used for the flow adjusting element 134 (to be seen in different cross sections 1343). Main component is a rotatable flap 1344 that covers about 50% of the respective channel. The flap 1344 is made out of perforated material and withstands the temperature of the heat transfer fluid. The flap 1344 can be stopped by the stop unit 1345. The flap is rotatable by the bearing 1346 with the rotational axis 1347.

Figure 8C:
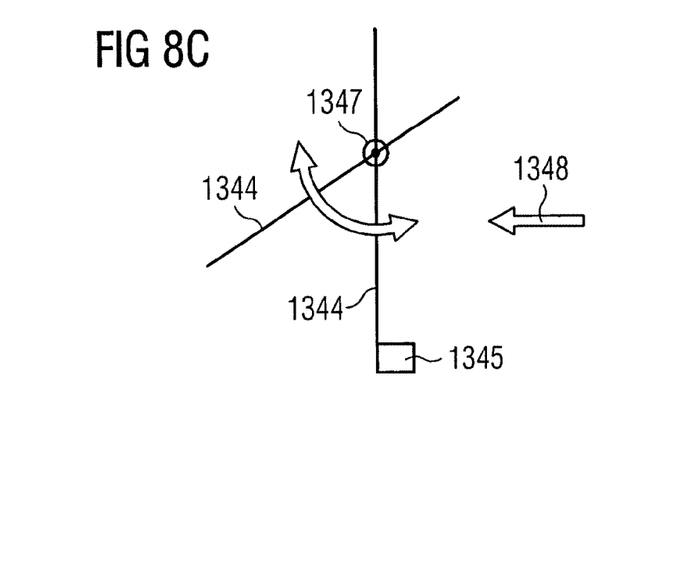

Looking at FIG. 8C a side view of the valve is depicted. The flap 1344 is rotatable around the rotational axis 1347 arranged and can be stopped by the stop unit 1345. The flow direction of flow 13 of the heat transfer fluid 13, of the lower horizontal flow 140 or of the upper horizontal flow 141 is depicted by the reference 1348.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A high temperature thermal energy exchange system, comprising:
    at least one horizontal heat exchange chamber with chamber boundaries which surround at least one heat exchange chamber interior of the heat exchange chamber, wherein the chamber boundaries comprise at least two vertically spaced inlet openings for guiding in an inflow of at least one heat transfer fluid into the heat exchange chamber interior through a lower inlet opening and an upper inlet opening and at least two vertically spaced outlet openings for guiding out an outflow of the at least one heat transfer fluid out of the heat exchange chamber interior;
    at least one heat storage material is arranged in the heat exchange chamber interior such that a heat exchange mass flow of the at least one heat transfer fluid through the heat exchange chamber interior causes a heat exchange between the heat storage material and the at least one heat transfer fluid, and
    the high temperature thermal energy exchange system is developed such that the heat exchange mass flow of the at least one heat transfer fluid through the heat exchange chamber interior includes a horizontal lower heat exchange mass flow through said lower inlet opening and a horizontal upper heat exchange mass flow through said upper inlet opening,
    wherein said lower heat exchange mass flow and said upper heat exchange mass flow differ from each other and are spaced in a vertical direction to create a variable temperature front and distribution in said at least one heat storage material located in said heat exchange chamber interior, and wherein the high temperature thermal energy exchange system is configured to operate in a discharging mode for discharging the at least one heat transfer fluid of the outflow for production of electricity.

2. The high temperature thermal energy exchange system according to claim 1, wherein the heat storage material comprises at least one chemically and/or physically stable material.

3. The high temperature thermal energy exchange system according to claim 1, wherein the heat storage material comprises sand and/or stones.

4. The high temperature thermal energy exchange system according to claim 1, wherein heat exchange channels are embedded in the heat storage material for guiding of the heat exchange flow through the heat exchange chamber interior.

5. The high temperature thermal energy exchange system according to claim 1, wherein the high temperature thermal energy exchange system is equipped with at least one flow adjusting element for adjusting the heat exchange flow of the at least one heat transfer fluid through the heat exchange chamber interior, inflow of the at least one heat transfer fluid into the heat exchange chamber interior and/or outflow of the at least one heat transfer fluid out of the heat exchange chamber interior.

6. The high temperature thermal energy exchange system according to claim 5, wherein the flow adjusting element comprises at least one active fluid motion device which is selected from the group consisting of blower, fan and pump; and/or the flow adjusting element comprises at least on passive fluid control device which is selected from the group consisting of activatable bypass pipe, nozzle, flap and valve.

7. The high temperature thermal energy exchange system according to claim 1, wherein the chamber boundary with one of the openings comprises a transition area with a tapering profile such that an opening diameter of the two vertically spaced inlet openings and the two vertically spaced outlet openings align to a first tapering profile diameter of the tapering profile and a chamber diameter of the heat exchange chamber aligns to a second tapering profile diameter of the tapering profile.

8. The high temperature thermal energy exchange system according to claim 1, wherein the at least one heat transfer fluid comprises a gas at ambient gas pressure.

9. The high temperature thermal energy exchange system according to claim 8, wherein the gas at the ambient pressure is air.

10. The high temperature thermal energy exchange system according to claim 1, further comprising at least one charging unit for heating the at least one heat transfer fluid.

11. The high temperature thermal energy exchange system according to claim 10, wherein the charging unit comprises at least one electrical heating device which is selected from the group consisting of resistance heater, inductive heater, emitter of electromagnetic radiation and heat pump.

12. The high temperature thermal energy exchange system according to claim 1, which is equipped with at least one measuring device for determining a charge status of the high temperature thermal energy exchange system.

13. The high temperature thermal energy exchange system according to claim 1, wherein a closed loop system is implemented and wherein the outflow out of the heat exchange chamber interior is delivered through the closed loop system to the inflow into the heat exchange chamber interior.

14. A method for exchanging thermal energy by using the high temperature thermal energy exchange system according to claim 1, wherein in an operating mode of the high temperature thermal energy exchange system a heat exchange mass flow of at least one heat transfer fluid is guided through the heat exchange chamber interior, whereby a heat exchange between the heat storage material and the at least one heat transfer fluid is caused.

15. The method according to claim 14, wherein the operating mode is selected from the group consisting of charging mode with a heat transfer from the at least one heat transfer fluid to the heat storage material and a discharging mode with a heat transfer from the heat storage material to the at least one heat transfer fluid.

16. The method according to claim 14, wherein during a charging mode the heat exchange mass flow is directed in a charging mode direction; during a discharging mode the heat exchange mass flow is directed in a discharging mode direction; and the charging mode direction and the discharging mode direction are opposite direction to each other.

17. The method according to claim 14, wherein an operating temperature of the operating mode is selected from the range between 300° C. and 1000° C.

18. A method for exchanging thermal energy by using the high temperature thermal energy exchange system according to claim 1,
wherein in an operating mode of the high temperature thermal energy exchange system a heat exchange mass flow of at least one heat transfer fluid is guided through the heat exchange chamber interior, whereby a heat exchange between the heat storage material and the at least one heat transfer fluid is caused,
wherein the operating mode is selected from the group consisting of charging mode with a heat transfer from the at least one heat transfer fluid to the heat storage material and a discharging mode with a heat transfer from the heat storage material to the at least one heat transfer fluid, and
wherein in the charging mode a lower heat transfer flow is larger than the upper heat transfer flow, and wherein in the discharging mode an upper heat transfer flow is larger than the lower heat transfer flow.

19. A method for exchanging thermal energy by using a high temperature thermal energy exchange system, comprising:
providing at least one horizontal heat exchange chamber with chamber boundaries which surround at least one heat exchange chamber interior of the heat exchange chamber, wherein the chamber boundaries comprise at least one inlet openings for guiding in an inflow of at least one heat transfer fluid into the heat exchange chamber interior and at least one outlet openings for guiding out an outflow of the at least one heat transfer fluid out of the heat exchange chamber interior;
wherein at least one heat storage material is arranged in the heat exchange chamber interior such that a heat exchange mass flow of the at least one heat transfer fluid through the heat exchange chamber interior causes a heat exchange between the heat storage material and the at least one heat transfer fluid, and
wherein the high temperature thermal energy exchange system is developed such that the heat exchange mass flow of the at least one heat transfer fluid through the heat exchange chamber interior horizontal heat exchange flows differ from each other in a vertical direction, wherein in an operating mode of the high temperature thermal energy exchange system a heat exchange mass flow of the at least one heat transfer fluid is guided through the heat exchange chamber interior, whereby a heat exchange between the heat storage material and the at least one heat transfer fluid is caused, wherein the operating mode is selected from the group consisting of charging mode with a heat transfer from the at least one heat transfer fluid to the heat storage material and a discharging mode with a heat transfer from the heat storage material to the at least one heat transfer fluid, wherein in the charging mode a lower heat transfer flow is larger than the upper heat transfer flow, and wherein in the discharging mode an upper heat transfer flow is larger than the lower heat transfer flow.

\* \* \* \* \*